United States Patent
Nishikawa et al.

(10) Patent No.: US 10,710,926 B2
(45) Date of Patent: Jul. 14, 2020

(54) SEALING MATERIAL

(71) Applicant: Nippon Electric Glass Co., Ltd., Shiga (JP)

(72) Inventors: Yoshikatsu Nishikawa, Shiga (JP); Masayuki Hirose, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 0 days.

(21) Appl. No.: 16/069,247

(22) PCT Filed: Jan. 5, 2017

(86) PCT No.: PCT/JP2017/000165
§ 371 (c)(1),
(2) Date: Jul. 11, 2018

(87) PCT Pub. No.: WO2017/122578
PCT Pub. Date: Jul. 20, 2017

(65) Prior Publication Data
US 2019/0010082 A1    Jan. 10, 2019

(30) Foreign Application Priority Data
Jan. 12, 2016 (JP) .................. 2016-003221

(51) Int. Cl.
*C03C 8/24* (2006.01)
*C03C 8/22* (2006.01)
(Continued)

(52) U.S. Cl.
CPC ............... *C03C 8/24* (2013.01); *C03C 3/085* (2013.01); *C03C 3/087* (2013.01); *C03C 8/02* (2013.01);
(Continued)

(58) Field of Classification Search
CPC .................................. C03C 8/22; C03C 8/24
See application file for complete search history.

(56) References Cited

U.S. PATENT DOCUMENTS

| | | | |
|---|---|---|---|
| 3,723,790 A * | 3/1973 | Dumbaugh, Jr. | ....... C03C 3/085 313/316 |
| 3,776,764 A | 12/1973 | Takagi et al. | |

(Continued)

FOREIGN PATENT DOCUMENTS

| | | |
|---|---|---|
| JP | 49-35044 | 9/1974 |
| JP | 1-153554 | 6/1989 |

(Continued)

OTHER PUBLICATIONS

International Preliminary Report on Patentability dated Jul. 17, 2018 in International Application No. PCT/JP2017/000165.

(Continued)

*Primary Examiner* — Karl E Group
(74) *Attorney, Agent, or Firm* — Wenderoth, Lind & Ponack, L.L.P.

(57) ABSTRACT

A sealing material of the present invention is a sealing material for sealing a metal material, including 70 mass % to 100 mass % of glass powder including alkali silicate glass and 0 mass % to 30 mass % of ceramic powder, and having a linear thermal expansion coefficient in a temperature range of from 30° C. to 380° C. of more than $100 \times 10^{-7}/°$ C. and $170 \times 10^{-7}/°$ C. or less.

7 Claims, 2 Drawing Sheets

(51) Int. Cl.
*C03C 3/087* (2006.01)
*C03C 3/085* (2006.01)
*H01R 9/16* (2006.01)
*C03C 8/02* (2006.01)
*H01R 13/52* (2006.01)
*F25B 31/00* (2006.01)

(52) U.S. Cl.
CPC .............. *C03C 8/22* (2013.01); *H01R 9/16* (2013.01); *F25B 31/00* (2013.01); *F25B 2500/221* (2013.01); *H01R 13/521* (2013.01)

(56) References Cited

U.S. PATENT DOCUMENTS

| | | | | |
|---|---|---|---|---|
| 4,417,913 | A * | 11/1983 | Davis | C03C 8/04 174/50.61 |
| 4,556,613 | A * | 12/1985 | Taylor | C03C 3/04 174/50.61 |
| 4,752,521 | A * | 6/1988 | Smith, III | C03C 8/24 428/209 |
| 4,814,298 | A | 3/1989 | Nelson et al. | |
| 4,952,531 | A * | 8/1990 | Cherukuri | C03C 8/24 257/E23.193 |
| 6,291,092 | B1 * | 9/2001 | Kohli | C03C 8/04 429/495 |
| 7,189,470 | B2 * | 3/2007 | Cortright | C03C 8/02 429/495 |
| 10,390,427 | B2 * | 8/2019 | Kanbara | C03C 3/062 |
| 2005/0277541 | A1 * | 12/2005 | Yoshii | C03C 3/085 501/26 |
| 2006/0160690 | A1 | 7/2006 | Cortright et al. | |
| 2012/0171810 | A1 * | 7/2012 | Park | C03C 8/18 438/98 |
| 2019/0023605 | A1 * | 1/2019 | Hirose | C03C 8/24 |

FOREIGN PATENT DOCUMENTS

| | | | | |
|---|---|---|---|---|
| JP | 2004123496 | A * | 4/2004 | ........... C03C 8/24 |
| JP | 2008-527680 | | 7/2008 | |
| JP | 2012074268 | A * | 4/2012 | |
| JP | 2014-175069 | | 9/2014 | |
| JP | 2015-64928 | | 4/2015 | |
| JP | 2015-69732 | | 4/2015 | |
| WO | 2004/031088 | | 4/2004 | |

OTHER PUBLICATIONS

International Search Report dated Apr. 11, 2017 in International Application No. PCT/JP2017/000165.

* cited by examiner

SEALING MATERIAL

TECHNICAL FIELD

The present invention relates to a sealing material, and more particularly, to a sealing material suitable for sealing a hermetic terminal of a refrigerant compressor to be used in a refrigerator and the like.

BACKGROUND ART

A hermetic terminal of a refrigerant compressor is produced by sealing a metal stem and a metal pin to each other with a sealing material in order to maintain hermetic reliability.

The sealing material is produced and used as described below. First, a glass raw material is melted and formed, and the resultant formed body is pulverized in a ball mill and then allowed to pass through a predetermined sieve to provide fine powder. Next, granules are produced by mixing the fine powder with a binder and granulating the mixture. In some cases, the granules are obtained by adding and mixing ceramic powder to glass powder and granulating the resultant composite powder. After that, the resultant granules are subjected to tablet molding to produce a green compact having a through-hole, and the green compact is increased in temperature from normal temperature, to thereby decompose and remove the binder and sinter the green compact. Next, a metal pin is inserted in the through-hole of the resultant sintered compact, and the sintered compact is in turn housed in a circular metal stem, followed by being loaded into a firing furnace, and fired at a temperature higher than a glass transition point under an inert atmosphere or a nitrogen atmosphere, to thereby seal the metal pin and the metal stem to each other. As a result, the sealing material is in a state of being compressed by the metal stem. The metal stem generally has a linear thermal expansion coefficient of $140 \times 10^{-7}/°$ C. The metal pin generally has a linear thermal expansion coefficient of from $100 \times 10^{-7}/°$ C. The sealing material generally has a linear thermal expansion coefficient of from $89 \times 10^{-7}/°$ C. to $95 \times 10^{-7}/°$ C.

FIG. 1A is a conceptual diagram for illustrating a hermetic terminal 1. The hermetic terminal 1 comprises a metal stem 11, a metal pin 12, and a sealing material 13. FIG. 1B is a conceptual diagram for illustrating, with respect to a main portion of the hermetic terminal 1 of FIG. 1A, a state of the metal stem 11, the metal pin 12, and the sealing material 13 before firing. FIG. 1C is a conceptual diagram for illustrating, with respect to the main portion of the hermetic terminal 1 of FIG. 1A, a state of the metal stem 11, the metal pin 12, and the sealing material 13 after the firing.

CITATION LIST

Patent literature 1: JP 2014-175069 A
Patent Literature 2; JP 2015-064928A
Patent Literature 3: JP 2015-069732 A

SUMMARY OF INVENTION

Technical Problem

In recent years, there has been an attempt to increase the capacity of a refrigerator and the like by increasing the current capacity of the hermetic terminal. In order to increase the current capacity of the hermetic terminal, it is effective to use a highly conductive metal as a core material of the metal pin.

However, when a metal pin comprising such highly conductive metal is sealed with a related-art sealing material, the sealing material is subjected to a large tensile stress by being pulled by the shrinking metal pin in the course of cooling to room temperature after a sealing step. With this, cracks are liable to occur in the sealing material, which may cause hermetic leakage of a refrigerant at the time of incorporation in the refrigerator and the like. Probable causes for this are that glass for sealing shows relatively low expansion and the highly conductive metal shows relatively high expansion, and that a difference in thermal expansion between the two is large.

The present invention has been made in view of the above-mentioned circumstances, and a technical object of the present invention is to devise a sealing material which hardly causes cracks when a metal pin comprising a highly conductive metal is sealed therewith, to thereby increase the current capacity and the hermetic reliability of a hermetic terminal.

Solution to Problem

The inventors of the present invention have repeated various experiments, and as a result, have found that the above-mentioned technical object can be achieved by restricting the linear thermal expansion coefficient of a sealing material within a predetermined range. Thus, the finding is proposed as the present invention. That is, according to one embodiment of the present invention, there is provided a sealing material for sealing a metal material, comprising 70 mass % to 100 mass % of glass powder comprising alkali silicate glass and 0 mass % to 30 mass % of ceramic powder, and having a linear thermal expansion coefficient in a temperature range of from 30° C. to 380° C. of more than $100 \times 10^{-7}/°$ C. and $170 \times 10^{-7}/°$ C. or less. Herein, the "alkali silicate glass" refers to glass which comprises $SiO_2$ and an alkali metal oxide ($Li_2O$, $Na_2O$, and $K_2O$) in a glass composition and in which the total amount of these components is 60 mol % or more. The "linear thermal expansion coefficient in a temperature range of from 30° C. to 380° C." refers to an average value obtained through measurement using a sintered compact processed into a predetermined shape as a measurement sample with a push-rod-type thermal expansion coefficient measurement apparatus (THA).

The sealing material according to the embodiment of the present invention comprises 70 mass % to 100 mass % of the glass powder comprising alkali silicate glass. When the glass powder comprising alkali silicate glass is used, a bonding temperature can be reduced while an increase in expansion of the sealing material is achieved.

In addition, the sealing material according to the embodiment of the present invention has a linear thermal expansion coefficient in a temperature range of from 30° C. to 380° C. of more than $100 \times 10^{-7}/°$ C. With this, when a metal pin comprising a highly conductive metal is sealed with the sealing material, the sealing material is hardly subjected to a large tensile stress from the metal pin in the course of cooling to room temperature after a sealing step, and cracks hardly occur in the sealing material. As a result, a situation in which hermetic leakage of a refrigerant occurs at the time of incorporation in a refrigerator and the like can be prevented.

Further, the sealing material according to the embodiment of the present invention has a linear thermal expansion coefficient in a temperature range of from 30° C. to 380° C. of $170\times10^{-7}/°$ C. or less. With this, the sealing material is easily subjected to a compression stress from a metal stem after the sealing step, and the hermetic reliability of a hermetic terminal can be increased.

Secondly, in the sealing material according to the embodiment of the present invention, it is preferred that the glass powder comprise high-expansion glass powder, and that the high-expansion glass powder comprise as a glass composition, in terms of mol %, 55% to 75% of $SiO_2$, 0% to 10% of $B_2O_3$, 1% to 12% of $Al_2O_3$, 17% to 28% of $Li_2O+K_2O$, and 0% to 15% of $MgO+CaO+SrO+BaO$. With this, the linear thermal expansion coefficient of the sealing material can be property increased. Herein, the "high-expansion glass powder" to glass powder having a linear thermal expansion coefficient in a temperature range of from 30° C. to 380° C. of more than $100\times10^{-7}/°$ C. The content of "$Li_2O+Na_2O+K_2O$" refers to the total content of $Li_2O$, $Na_2O$, and $K_2O$. The content of "$MgO+CaO+SrO+BaO$" refers to the total content of MgO, CaO, SrO, and BaO.

Thirdly, in the sealing material according to the embodiment of the present invention, it is preferred that the glass powder comprise the high-expansion glass powder and low-expansion glass powder. Herein, the "low-expansion glass powder" refers to glass powder having a linear thermal expansion coefficient in a temperature range of from 30° C. to 380° C. of $100\times10^{-7}/°$ C. or less.

Fourthly, in the sealing material according to the embodiment of the present invention, it is preferred that the sealing material comprise 70 mass % to 99 mass % of the glass powder and 1 mass % to 30 mass % of the ceramic powder, that the glass powder comprise low-expansion glass powder, and that the ceramic powder comprise high-expansion ceramic powder. Herein, the "high-expansion ceramic powder" refers to ceramic powder having a linear thermal expansion coefficient in a temperature range of from 30° C. to 380° C. of more than $100\times10^{-7}/°$ C.

Fifthly, in the sealing material according to the embodiment of the present invention, it is preferred that the high-expansion ceramic powder comprise any one of cristobalite, tridymite, and calcium fluoride.

Sixthly, in the sealing material according to the embodiment of the present invention, it is preferred that the sealing material have a granular form.

Seventhly, in the sealing material according to the embodiment of the present invention, it is preferred that the sealing material comprise a sintered compact.

Eighthly, in the sealing material according to the embodiment of the present invention, it is preferred that the sealing material be used for sealing a hermetic terminal.

DESCRIPTION OF EMBODIMENTS

Figure 1A:
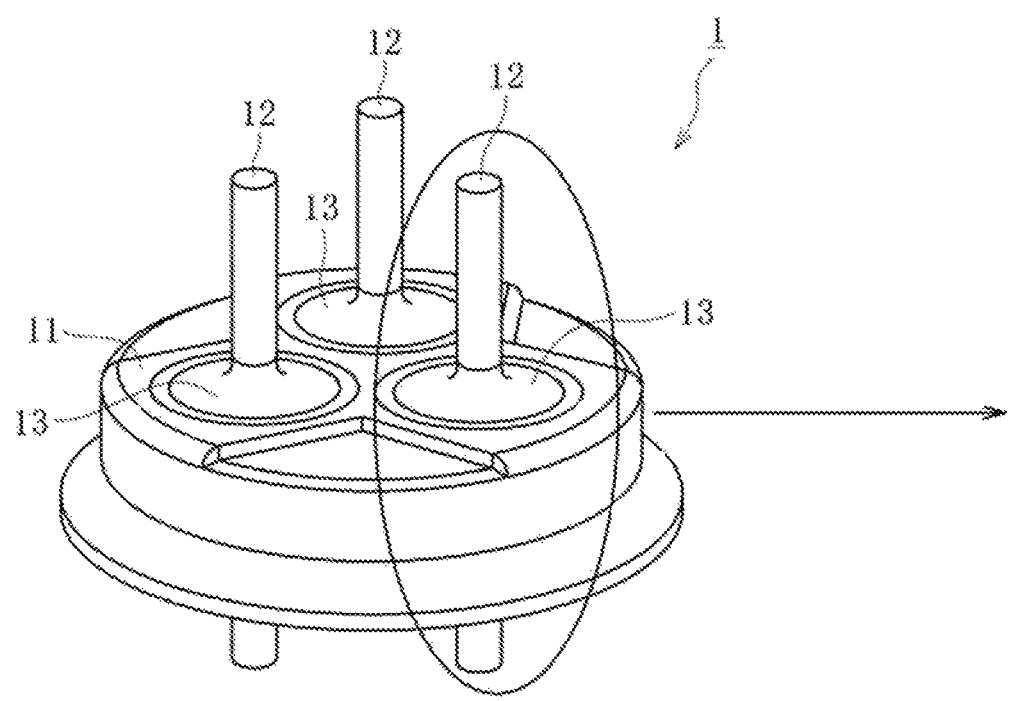
FIG. 1A is a conceptual diagram for illustrating a hermetic terminal.
Figure 1B:
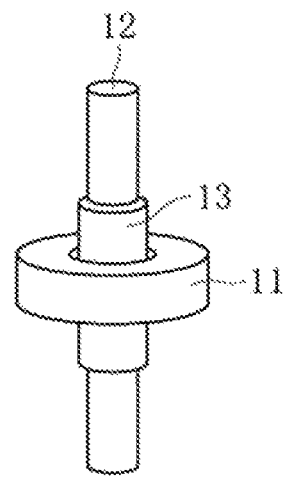
FIG. 1B is a conceptual diagram for illustrating a state of a metal stem, a metal pin, and a sealing material before firing.
Figure 1C:
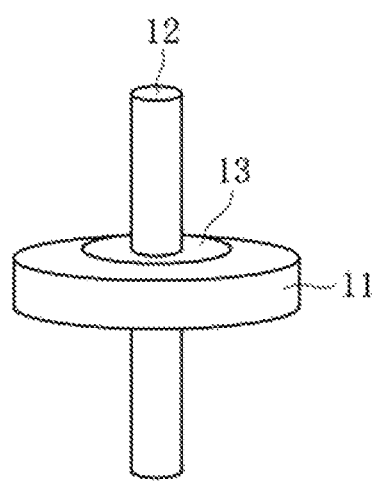
FIG. 1C is a conceptual diagram for illustrating a state of the metal stem, the metal pin, and the sealing material after the firing.

In a sealing material of the present invention, the content of glass powder is from 70 mass % to 100 mass %, preferably from 80 mass % to 100 mass %, more preferably from 90 mass % to 100 mass %, still more preferably from 95 mass % to 100 mass %, particularly preferably from more than 97 mass % to 100 mass %. In addition, the content of ceramic powder is from 0 mass % to 30 mass %, preferably from 0 mass % to 20 mass %, more preferably from 0 mass % to 10 mass %, still more preferably from 0 mass % to 5 mass %, particularly preferably from 0 mass % to less than 3 mass %. When the content of the glass powder is too small (when the content of the ceramic powder is too large), the amount of a melting accelerate component is reduced, and hence sufficient fluidity is not obtained in a sealing step, and hermetic reliability is liable to be reduced.

The sealing material of the present invention has a linear thermal expansion coefficient in a temperature range of from 30° C. to 380° C. of more than $100\times10^{-7}/°$ C., preferably $103\times10^{-7}/°$ C. or more, more preferably $106\times10^{-7}/°$ C. or more, still more preferably $108\times10^{-7}/°$ C. or more. When the linear thermal expansion coefficient in a temperature range of from 30° C. to 380° C. is too low, in the case in which a metal pin comprising a highly conductive metal is sealed with the sealing material, the sealing material is liable to be subjected to a large tensile stress from the metal pin in the course of cooling to room temperature after the sealing step, and cracks are liable to occur in the sealing material. As a result, there is a risk in that hermetic leakage of a refrigerant occurs at the time of incorporation in a refrigerator and the like. Meanwhile, the sealing material of the present invention has a linear thermal expansion coefficient in a temperature range of from 30° C. to 380° C. of $170\times10^{-7}/°$ C. or less, preferably $150\times10^{-7}/°$ C. or less, more preferably $130\times10^{-7}/°$ C. or less, still more preferably $120\times10^{-7}/°$ C. or less. When the linear thermal expansion coefficient in a temperature range of from 30° C. to 380° C. is too high, it becomes difficult for the sealing material to be subjected to a compression stress from a metal stem after the sealing step, and the hermetic reliability of a hermetic terminal is liable to be reduced.

In the sealing material of the present invention, it is preferred that the glass powder comprise at least high-expansion glass powder, and that the high-expansion glass powder comprise as a glass composition, in terms of mol %, 55% to 75% of $SiO_2$, 0% to 10% of $B_2O_3$, 1% to 12% of $Al_2O_3$, 17% to 28% of $Li_2O+Na_2O+K_2O$, and 0% to 15% of $MgO+CaO+SrO+BaO$. The reasons why the contents of the components of the high-expansion glass powder are limited as described above are described below. In the description of the contents of the components, the expression "%" means "mol %".

$SiO_2$ is a main component for forming a glass skeleton, and the content of $SiO_2$ is preferably from 55% to 75%, more preferably from 60% to 70%. When the content of $SiO_2$ is too small, there is a risk in that the linear thermal expansion coefficient is increased improperly. In addition, water resistance and weather resistance are liable to be reduced. Meanwhile, when the content of $SiO_2$ is too large, there is a risk in that the linear thermal expansion coefficient is reduced improperly. In addition, a bonding temperature is liable to be increased. When the water resistance and the weather resistance are reduced, glass has restriction in its handling in a granulation step, and further, there is a risk in that the long-term reliability of the hermetic terminal is reduced.

$B_2O_3$ is a component which increases meltability and reduces the bonding temperature. The content of $B_2O$ is preferably from 0% to 10%, more preferably from 0% to 5%, still more preferably from 0% to 3%. When the content of $B_2O_3$ is too large, abnormal shrinkage is liable to occur in a temperature range around a glass transition point in the course of cooling to room temperature after the sealing step.

$Al_2O_3$ is a component which increases the water resistance and the weather resistance. The content of $Al_2O_3$ is preferably from 1% to 12%, more preferably from 2% to 10%, still more preferably from 5% to 8%. When the content of $Al_2O_3$ is too small, the water resistance and the weather resistance are liable to be reduced. Meanwhile, when the content of $Al_2O_3$ is too large, there is a risk in that the linear thermal expansion coefficient is reduced improperly. In addition, the bonding temperature is liable to be increased.

An alkali metal oxide ($Li_2O$, $Na_2O$, and $K_2O$) is a component which increases the linear thermal expansion coefficient, and is also a component which reduces the bonding temperature, but is a component which reduces the water resistance and the weather resistance. The content of $Li_2O+Na_2O+K_2O$ is preferably from 17% to 28%, more preferably from 19% to 25%, still more preferably from more than 20% to 23%. The content of $Li_2O$ is preferably from 0% to 12%, more preferably from 0% to 8%, still more preferably from 0% to 5%. The content of $Na_2O$ is preferably from 10% to 23%, more preferably from 12% to 20%, still more preferably from 15% to 18%. The content of $K_2O$ is preferably from 1% to 12%, more preferably from 3% to 10%, still more preferably from 5% to 7%. When the content of the alkali metal oxide is too small, there is a risk in that the linear thermal expansion coefficient is reduced improperly. In addition, the bonding temperature is liable to be increased. Meanwhile, when the content of the alkali metal oxide is too large, the water resistance and the weather resistance are liable to be reduced.

An alkaline earth metal oxide (MgO, CaO, SrO, and BaO) is a component which reduces the bonding temperature. The content of MgO+CaO+SrO+BaO is preferably from 0% to 15%, more preferably from 2% to 12%, still more preferably from 4% to 9%. The content of MgO is preferably from 0% to 7%, more preferably from 1% to 5%. The content of CaO is preferably from 0% to 7%, more preferably from 1% to 5%. The content of SrO is preferably from 0% to 5%, more preferably from 0% to 3%, still more preferably from 0% to 1%. The content of BaO is preferably from 0% to 5%, more preferably from 0% to 3%, still more preferably from 0% to 1%. When the content of the alkaline earth metal oxide is too small, the bonding temperature is liable to be increased. Meanwhile, when the content of the alkaline earth metal oxide is too large, the glass skeleton is liable to be unstable.

Other than the above-mentioned components, for example, $TiO_2$, $ZrO_2$, $F_2$, $Cl_2$, $La_2O_3$, $MnO_2$, $Cr_2O_3$, $Fe_2O_3$, $Co_2O_3$, and the like may be introduced at respective contents of from 0.1% to 5% unless the effects of the present invention are impaired improperly.

In the sealing material of the present invention, the glass powder preferably comprises the high-expansion glass powder and low-expansion glass powder. In general, when the linear thermal expansion coefficient of the glass powder is to be increased, the content of the alkali metal oxide in a glass composition needs to be increased. In this case, however, the water resistance and the weather resistance of the glass powder are liable to be reduced. Therefore, the high-expansion glass powder tends to have low water resistance and low weather resistance, and the low-expansion glass powder tends to have high water resistance and high weather resistance. In view of the foregoing, the high-expansion glass powder and the low-expansion glass powder are mixed to be used as the glass powder, and thus the drawbacks of both the powders can be compensated for by each other. That is, the water resistance and the weather resistance can be increased while the linear thermal expansion coefficient is increased.

Various alkali silicate glasses may be used as the low-expansion glass powder. Of those, low-expansion glass powder comprising as a glass composition, in terms of mol %, 65% to 82% of $SiO_2$, 0% to 10% of $B_2O_3$, 0% to of $Al_2O_3$, 10% to 20% of $Li_2O+Na_2O+K_2O$, and to 1% to 15% of MgO+CaO+SrO+BaO is preferred. With this, the water resistance and the weather resistance can be increased while the bonding temperature is reduced.

Other than the above-mentioned case in which the sealing material of the present invention is formed only of the glass powder, it is also preferred that the sealing material of the present invention comprise 70 mass % to 99 mass % of the glass powder and 1 mass % to 30 mass % of the ceramic powder, the glass powder contain the low-expansion glass powder, and the ceramic powder contain high-expansion ceramic powder. When the low-expansion glass powder and the high-expansion ceramic powder are introduced in the sealing material, the water resistance and the weather resistance can be increased while the linear thermal expansion coefficient of the sealing material is increased. In this case, the content of the high-expansion ceramic powder is preferably from 1 mass % to 30 mass %, more preferably from 2 mass % to 15 mass %, still, more preferably from 3 mass % to 6 mass %. When the content of the high-expansion ceramic powder is too small, it becomes difficult to increase the linear thermal expansion coefficient of the sealing material. Meanwhile, when the content of the high-expansion ceramic powder is too large, the amount of the melting accelerate component is reduced, and hence bonding strength is reduced, and the hermetic reliability is liable to be reduced.

Various ceramic powders may be used as the high-expansion ceramic powder, but from the viewpoint of compatibility with the alkali silicate glass, any one of cristobalite, tridymite, and calcium fluoride is preferred.

The sealing material of the present invention preferably has a granular form. With this, a green compact having a predetermined shape, particularly a green compact having a through-hole for inserting a metal pin can be easily produced through tablet molding.

The sealing material of the present invention preferably comprises a sintered compact. With this, when the sealing material having inserted therein a metal pin is housed in a metal stem, chipping of the sealing material can be suppressed.

EXAMPLES

Now, the present invention is described by way of Examples. The following Examples are merely illustrative. The present invention is by no means limited to the following Examples.

Sample Nos. 1 and 2 are shown in Table 1.

TABLE 1

|  |  | No. 1 | No. 2 |
|---|---|---|---|
| Glass composition (mol %) | $SiO_2$ | 75 | 66 |
|  | $B_2O_3$ | 0 | 0 |
|  | $Al_2O_3$ | 3 | 7 |
|  | $Li_2O$ | 0 | 1 |
|  | $Na_2O$ | 8 | 14 |
|  | $K_2O$ | 6 | 7 |
|  | MgO | 0 | 1 |
|  | CaO | 0 | 4 |

TABLE 1-continued

|  | No. 1 | No. 2 |
|---|---|---|
| SrO | 2 | 0 |
| BaO | 6 | 0 |
| $\alpha_{30\text{-}380°\,C.}$ ($\times 10^{-7}/°$ C.) | 97 | 118 |

First, a glass batch obtained by blending glass raw materials so as to give the glass composition shown in Table 1 was loaded in a platinum crucible, and melted at 1,500° C. for 4 hours. At the time of the melting, the glass batch was stirred with a platinum stirrer to be homogenized. Next, the resultant molten glass was formed into a film shape with a double roller, pulverized with a ball mill, and then classified with a test sieve. Thus, Sample Nos. 1 and 2 each having an average particle diameter $D_{50}$ of about 30 μm were obtained, Sample Nos. 1 and 2 were each measured for a linear thermal expansion coefficient in a temperature range of from 30° C. to 380° C. The linear thermal expansion coefficients of Sample Nos. 1 and 2 are each an average value obtained through measurement using glass bulk processed into a predetermined shape as a measurement sample with a push-rod-type thermal expansion coefficient measurement apparatus (TMA).

Experiment 1

A sealing material was obtained by mixing Sample No. 1 and Sample No. 2 at a mass ratio of 1:1, followed by granulation. The sealing material had a linear thermal expansion coefficient in a temperature range of from 30° C. to 380° C. of $110\times10^{-7}/°$ C. The linear thermal expansion coefficient of the sealing material is an average value obtained through measurement with TMA using, as a measurement sample, a sintered compact processed into a predetermined shape after having been sintered at a temperature higher than the softening point of the sealing material by 30° C. (the same applies to Experiment 2).

Experiment 2

A sealing material, was obtained by mixing Sample No. 1 and cristobalite powder (average particle diameter $D_{50}$: about 10 μm) at a mass ratio of 96:4, followed by granulation. The sealing material had a linear thermal expansion coefficient in a temperature range of from 30° C. to 380° C. of $110\times10^{-7}/°$ C.

The linear thermal expansion coefficients in a temperature range of from 30° C. to 380° C. of the sealing materials obtained in Experiments 1 and 2 are restricted within a predetermined range. Therefore, it is considered that cracks hardly occur in each of the sealing materials obtained in Experiments 1 and 2 when a metal pin comprising a highly conductive metal is sealed with the sealing material. As a result, it is considered that the current capacity and the hermetic reliability of a hermetic terminal can be increased through use of each of the sealing materials obtained in Experiments 1 and 2.

REFERENCE SIGNS LIST 1 hermetic terminal
11 metal stem
12 metal pin
13 sealing material

The invention claimed is:

1. A sealing material for sealing a metal material, comprising 70 mass % to 100 mass % of glass powder comprising alkali metal oxide silicate glass and 0 mass % to 30 mass % of ceramic powder, and having a linear thermal expansion coefficient in a temperature range of from 30° C. to 380° C. of more than $100\times10^{-7}/°$ C. and $170\times10^{-7}/°$ C. or less,
wherein the glass powder comprises high-expansion glass powder, and
wherein the high-expansion glass powder comprises as a glass composition, in terms of mol %, 55% to 75% of $SiO_2$, 0% to 10% of $B_2O_3$, 1% to 12% of $Al_2O_3$, 17% to 28% of $Li_2O+Na_2O+K_2O$, 10% to 23% of $Na_2O$, 1% to 7% of CaO, and up to 9% of $MgO+CaO+SrO+BaO$.

2. The sealing material according to claim 1, wherein the glass powder comprises the high-expansion glass powder and low-expansion glass powder.

3. The sealing material according to claim 1,
wherein the sealing material comprises 70 mass % to 99 mass % of the glass powder and 1 mass % to 30 mass % of the ceramic powder, and
wherein the glass powder further comprises low-expansion glass powder, and the ceramic powder comprises high-expansion ceramic powder.

4. The sealing material according to claim 3, wherein the high-expansion ceramic powder comprises any one selected from the group consisting of cristobalite, tridymite, and calcium fluoride.

5. The sealing material according to claim 1, wherein the sealing material has a granular form.

6. The sealing material according to claim 1, wherein the sealing material comprises a sintered compact,
wherein the sintered compact is formed by heating a green compact, and
wherein the green compact is produced by tablet molding granules.

7. The sealing material according to claim 1, wherein the sealing material is used for sealing a hermetic terminal.

* * * * *